United States Patent
Setty et al.

(10) Patent No.: US 10,984,134 B2
(45) Date of Patent: Apr. 20, 2021

(54) BLOCKCHAIN SYSTEM FOR LEVERAGING MEMBER NODES TO ACHIEVE CONSENSUS

(71) Applicant: Microsoft Technology Licensing, LLC, Redmond, WA (US)

(72) Inventors: Srinath Setty, Redmond, WA (US); Lidong Zhou, Bellevue, WA (US); Michael Lowell Roberts, Seattle, WA (US); Ramarathnam Venkatesan, Redmond, WA (US); Soumya Basu, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 339 days.

(21) Appl. No.: 15/727,522

(22) Filed: Oct. 6, 2017

(65) Prior Publication Data

US 2019/0018984 A1 Jan. 17, 2019

Related U.S. Application Data

(60) Provisional application No. 62/532,933, filed on Jul. 14, 2017.

(51) Int. Cl.
| | |
|---|---|
| *G06F 21/64* | (2013.01) |
| *H04L 9/32* | (2006.01) |
| *H04L 29/06* | (2006.01) |
| *H04L 9/06* | (2006.01) |

(52) U.S. Cl.
CPC ............ *G06F 21/64* (2013.01); *H04L 9/0643* (2013.01); *H04L 9/3239* (2013.01); *H04L 9/3247* (2013.01); *H04L 63/123* (2013.01); *H04L 63/14* (2013.01); *H04L 2209/38* (2013.01)

(58) Field of Classification Search
CPC ..... G06F 21/64; H04L 9/0643; H04L 9/3239; H04L 9/3247; H04L 63/123; H04L 63/14; H04L 2209/38
See application file for complete search history.

(56) References Cited

U.S. PATENT DOCUMENTS

| | | | |
|---|---|---|---|
| 2016/0259937 A1* | 9/2016 | Ford | G06F 21/577 |
| 2016/0260169 A1† | 9/2016 | Arnold et al. | |
| 2017/0103468 A1* | 4/2017 | Orsini | G06Q 40/12 |
| 2017/0116693 A1* | 4/2017 | Rae | H04L 9/3236 |
| 2017/0155515 A1 | 6/2017 | Androulaki et al. | |
| 2017/0374049 A1† | 12/2017 | Ateniese et al. | |

OTHER PUBLICATIONS

Gaetani, et al., "Blockchain-based Database to Ensure Data Integrity in Cloud Computing Environments", In Proceedings of Italian Conference on Cybersecurity, Venice, Italy, Jul. 4, 2017.

(Continued)

*Primary Examiner* — Shin-Hon (Eric) Chen
*Assistant Examiner* — Jessica J South
(74) *Attorney, Agent, or Firm* — Rainier Patents, P.S.

(57) ABSTRACT

Systems and methods described herein relate to secure, efficient, confidential, and/or outsourced blockchain networks, which can enable a group of mutually distrusting participants to securely share state and then agree on a linear history of operations on that shared state.

20 Claims, 10 Drawing Sheets

(56) References Cited

OTHER PUBLICATIONS

"International Search Report and Written Opinion issued in PCT Application No. PCT/US18/034804", dated Jul. 17, 2016, 17 Pages.
Siva, et al., "Survey of consensus protocols on blockchain applications", In Proceedings of 4th international Conference on Advanced Computing and Communication Systems (ICACCS), Jan. 6. 2017, 5 Pages.
Vukolic, Marko, "Rethinking Permissioned Blockchains", In Proceedings of the ACM workshop on blockchain, cryptocurrencies and contracts, Jan. 1, 2017, 5 Pages.

\* cited by examiner
† cited by third party

BLOCKCHAIN SYSTEM FOR LEVERAGING MEMBER NODES TO ACHIEVE CONSENSUS

PRIORITY

This utility application claims priority to U.S. Provisional Application No. 62/532,933, filed on Jul. 14, 2017, which is incorporated by reference in its entirety.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DETAILED DESCRIPTION

This description relates to secure, efficient, confidential, and outsourced blockchain networks. Some implementations of the present concepts are contained in a system referred to as "volt," which can enable a group of mutually distrusting participants to securely share state and then agree on a linear history of operations on that shared state.

Figure 1:
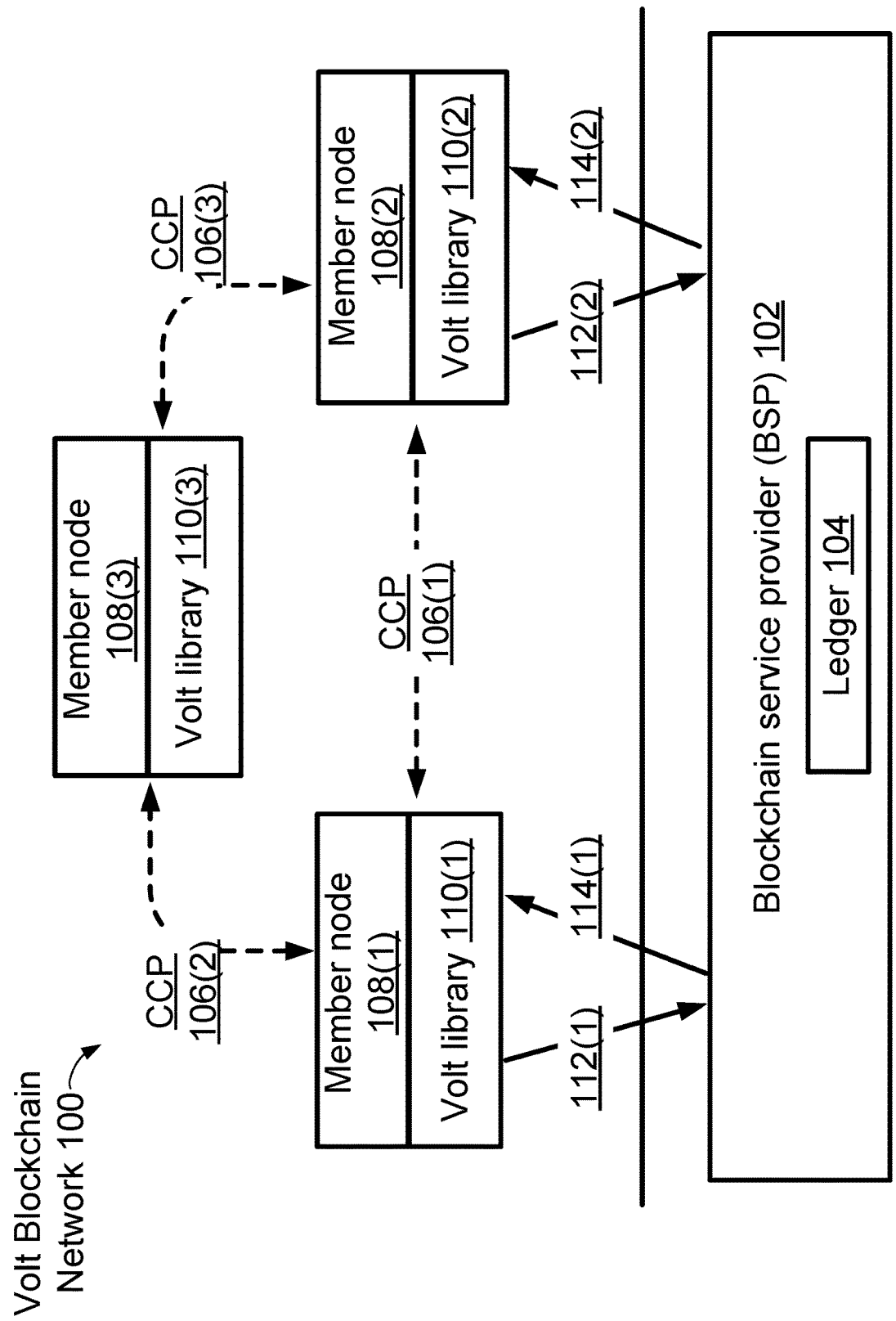
FIGS. 1 and 6A-6C show example volt blockchain systems or networks in accordance with some implementations of the present concepts.

FIG. 1 shows an example volt blockchain system or network 100. One aspect of volt is the abstraction of a blockchain service provider (BSP) 102, which creates and updates an append-only, tamper-resistant ledger 104. Another aspect of volt is a new distributed protocol called "Caesar consensus" or "Caesar consensus protocol" (CCP) 106. An example method for implementing the CCP 106 is described below relative to FIG. 4. Briefly, the CCP can leverage the BSP 102 to enable members (e.g., or member nodes) 108 of the volt blockchain network to reach consensus on the BSP's ledger 104, even when the BSP 102 misbehaves arbitrarily. Thus, by design, the BSP 102 is untrusted, so it can run on any untrusted infrastructure. As used herein, the term BSP can refer to both components that provide the blockchain service and the service itself. Thus, BSP can refer to component(s) that provide the blockchain service and/or the blockchain service. To provide clarity the term BSP component may be employed herein when referring specifically to the components providing the service.

In some implementations, the BSP 102 can be instantiated in the cloud, which offers inexpensive, abundant, and (mostly) reliable computing resources. In some implementations, the BSP can be manifest as a modular design that emulates the BSP abstraction with four well-defined components, which makes it easy for a service provider to harden them and offer a trustworthy service. Additionally, the modular design can enable the members of a network to outsource storage and computation (which may be required to participate in the network) to the BSP such that the members only have to rely on the BSP for availability. Finally, volt tends to incur low resource costs and to provide good performance.

Blockchain technology, which underpins popular cryptocurrencies such as Bitcoin and Ethereum has been touted to dramatically transform common business processes in many areas such as finance, health care, and the public sector, among others. One of the fundamental appeals of blockchain is its promise to enable verifiable, low cost, and trustworthy business processes without involving expensive, trusted intermediaries, which are rampant in the aforementioned business areas. One key mechanism behind this technology is an append-only, tamper-resistant ledger shared by all participants in a blockchain network.

However, most blockchains fail to deliver this promise fully: they fall short in security, privacy, performance, and/or cost. For example, the security of public blockchain systems such as Bitcoin and Ethereum relies on gametheoretic and incentive-based mechanisms (e.g., mining based on proof-of-work) because they operate in a permissionless membership model where anyone can participate in the system. Furthermore, they are slow and expensive (due to mining) for many business applications.

This has led to blockchains in a permissioned environment such as the cloud, where participation is restricted to entities of a business process. Some of these solutions employ public blockchain protocols such as Ethereum, but for such systems, strong security requires deploying enormous computational resources for mining. Others propose systems such as Hyperledger, Tendermint, and Ripple, which use variants of Byzantine fault-tolerance (BFT) protocols for consensus in a blockchain network.

These BFT-based approaches tend to be resource efficient compared to mining-based systems as they do not employ mining. However, members in such blockchains must trust the full implementation of the BFT protocol as well the infrastructure where it is deployed (e.g., to maintain the fault threshold expected by the BFT protocol). Thus, these systems face a fundamental deployment conflict. For example, they can use inexpensive and abundant computing resources in the cloud, but the members must trust the cloud infrastructure. Alternatively, they can operate in a fully decentralized environment, but they cannot leverage the cloud and still must trust the full implementation.

The present implementations can resolve this conflict with volt, which is the first system to enable secure and resource efficient blockchain networks in a permissioned membership model such that the bulk of the work can be safely outsourced to untrusted infrastructure. To achieve this, volt advocates a new architecture for blockchain networks (e.g., volt blockchain network 100), which introduces the concept of the blockchain service provider 102 and novel distributed protocol, Caesar consensus 106 that, unlike a traditional consensus protocol, is run by member nodes 108 participating in a blockchain network along with the BSP.

In volt, member nodes 108 can outsource the task of creating and updating the append-only, tamper-resistant ledger 104 (where entries are governed by a state machine defined by the members of the blockchain network) to the BSP 102, which can be naturally implemented and operated by a service provider on untrusted infrastructure. Despite outsourcing critical work to the BSP 102, member nodes 108 use Caesar consensus 106 to detect misbehavior by the BSP, to recover from misbehavior, and to reach consensus on the ledger 104. Caesar consensus 106 can do all these through end-to-end checks on properties of the BSP 102.

A key observation in Caesar consensus 106 is that member nodes 108 of a blockchain network can leverage the append-only, tamper-resistant ledger 104 maintained by the BSP 102 to reach agreement on a prefix of the ledger 104, by writing special messages of a single type on the ledger itself. This mechanism can lead to a simple consensus algorithm for permissioned blockchain networks. Furthermore, those special messages can be recorded on the ledger 104 and processed by member nodes 108 in a network, so member nodes can use them to enforce a flexible class of policies to determine which prefix of the ledger is agreed-upon by the network. As an example, the blockchain network can enforce consistency levels ranging from strong to eventual, and fault models (for member nodes) from crash to Byzantine, while keeping the BSP 102 oblivious to these policies.

The above volt concepts are in stark contrast with the aforementioned BFT-based systems where nodes reach consensus on a set of transactions (using a protocol such as PBFT) before writing them to a tamper-resistant ledger, thus embedding the consensus policy a priori into the system. Additionally, in volt, if the BSP 102 or any malicious member node (such as for instance member node 108(1)) commits a safety violation and exposes it to an honest member node (such as member nodes 108(2) and/or 108(3)), it can eventually be blamed as malicious behavior by the BSP. Such a blame is cryptographically verifiable by other honest member nodes, and it does not require any threshold assumption.

In addition to outsourcing the task of creating and updating the ledger 104 to the BSP 102, volt can enable member nodes 108 to outsource storage and computation required to participate in the Caesar consensus protocol 106 to the BSP, while relying on the BSP only for availability. To do so, volt's BSP 102 can be designed in a modular fashion.

In one such modular BSP implementation, the modules can include a verifiable store with receipts, a chaining service, a state transition service, and/or a coordinator (coordinator module). Such a modular design makes it easy for a service provider to ensure the BSP is almost always trustworthy. It also allows different instantiations of these modules for flexibility, performance, and/or security. As an example, the state transition service can be instantiated with secure execution environments on modern processors to enable outsourcing and confidentiality. One such example implementation is described in more detail below relative to FIG. 5.

From one perspective, the present concepts can include the following advancements, among others. First, a new foundation—a blockchain service provider and Caesar consensus—for designing permissioned blockchain networks. Second, enabling member nodes to outsource storage and computation to the BSP through a modular design. Third, volt can be implemented in a cloud-based deployment model atop existing cloud services. For instance, in relation to Microsoft® Corp., Volt can be offered on top of Azure® service fabric and Document DB. Volt could likewise be offered in combination with other cloud services, such as those offered by Amazon and/or Google, among others. Alternatively, volt can be implemented on the member nodes (e.g., distributed). Experimental evaluation shows that volt achieves several thousands of transactions per second per ledger for a realistic blockchain application (which is 190× higher than an Ethereum-based baseline).

A goal of volt is to enable an emerging class of applications that employ blockchains to re-architect critical business processes. Examples include clearing and settlement, supply chain management, health care, asset registries, etc. Such applications are referred to as secure multi-party collaborations (SMCs).

From one perspective, SMCs can involve mutually distrusting entities sharing state and then agreeing on a history of operations on that shared state. Some of the present implementations can satisfy the mission-critical nature of these applications. For instance, some implementations can ensure that all mutations to shared state are cryptographically verifiable by all participants. These implementations can make it computationally hard to tamper with the history of operations on shared state, or the state itself. The implementations can keep the shared state and the operations on it private. The implementations can tolerate malice from participants.

In principle, blockchain technology can support SMC, since, at its core, blockchain technology can make a group of mutually distrusting parties maintain a shared ledger. This is evident in two popular blockchain systems. Bitcoin is a cryptocurrency where users are identified by public keys in a digital signature scheme, and users transact using their private keys. Bitcoin records all transactions in a blockchain, which is an append-only, cryptographically chained sequence of blocks. The blockchain is maintained by miners in a decentralized network, and the miners agree on the current state of blockchain via mining. Miners solve computational puzzles to append new blocks to the chain. Thus, Bitcoin creates a trustworthy ledger using a novel combination of puzzles and incentives.

Ethereum extends Bitcoin's programmability: users can store stateful computations on the blockchain. They can then mutate the state of such computations by submitting transactions, which are also stored in the same blockchain. Such a model enables building general applications atop blockchain.

It is well known that enterprises cannot directly use public blockchains for SMC, since they scale poorly. As an example, the maximum throughput of Bitcoin tends to be only 7 transactions/second. There are proposals to address the throughput limitations of public blockchains. However, the blockchain is still secured via mining and incentives, which can lead to surprising attacks. For example, rational miners have incentives to skip verifying expensive transactions in new blocks. Additionally, public blockchains are expensive. For instance, it costs $125,000/GB of storage on Ethereum. This has led to blockchains in a permissioned setting, but as mentioned above, these systems face a fundamental conflict between decentralization and trust, which is resolved by the present concepts.

Volt can employ an alternate approach employing BSP and/or Caesar consensus. For instance, in some implementations, BSP and Caesar consensus, which can leverage the BSP and the cryptographic properties of a blockchain, to enable enterprises to create secure and efficient blockchain networks. Additionally, the modular design for the BSP can allow enterprises to outsource storage and/or computation to the BSP, while relying on the BSP only for availability and liveness.

The discussion below provides an overview of volt concepts followed by details of BSP and Caesar consensus implementations. The discussion concludes with accountability properties of the BSP.

In some implementations, volt can target permissioned blockchains, which limit participation to entities involved in a business/organization application. Continuing to look at FIG. 1, BSP 102 can naturally be offered as a service on any untrusted infrastructure including the cloud by a cloud provider such as Amazon AWS and/or Microsoft Azure. Member nodes 108 on the other hand can be owned and operated by the participating entities in the volt blockchain network 100.

Member nodes 108 can use a volt library 110 that implements the CCP. For instance, the volt library 110 can interact with the BSP 102 (i.e., to submit transactions at 112 and/or to learn the current state of the volt blockchain network at 114). (The two-dimensional graphical representation of volt blockchain network 100 in FIG. 1 cannot readily convey all of the inter-relationships that may occur in volt blockchain network. For instance, transactions 112 and state 114 communications between member node 108(3) and BSP 102 are not shown to reduce clutter on the drawing page.) As mentioned above, the member nodes 108 can also implement the Caesar consensus protocol at 106, without requiring any cooperation from the BSP 102 beyond its interface. For simplicity, implementations can be based on the assumption that only member nodes 108 submit transactions.

When a volt blockchain network 100 is initialized, member nodes 108 collectively define rules that govern the network. This includes the current list of participants, initial state of the network, and rules to authenticate and validate transactions. The latter two are encoded in a blockchain state machine (BSM) (introduced below relative to FIG. 2), which can include code executed by the volt blockchain network to process transactions. The discussion below relates to blockchain state machines and the programming model volt supports as well as where this initialization information is recorded.

The explanation relies on several assumptions. First, the assumption that the BSP 102 and member nodes 108 obey standard cryptographic hardness assumptions. Second, that the BSP's public key in a digital signature scheme is known to all member nodes 108, and that all member nodes in a blockchain network know the public keys of other member nodes. Third, that the BSP 102 and member nodes 108 could arbitrarily deviate from their protocol; in particular, that they could be controlled by the same global adversary (this aspect is discussed in more detail below).

It can be assumed that the volt blockchain network 100 could be adversarial by dropping, reordering, and duplicating messages. However, it can be assumed that correct entities (i.e., those that follow their prescribed protocol) in the volt blockchain network can eventually communicate with other correct entities. Also assume that the volt blockchain network is eventually synchronous for liveness.

A core ingredient in a volt blockchain network is the blockchain data structure from decentralized cryptocurrencies. This data structure can be generalized and called a verifiable outsourced ledger (VOL).

Figure 2:
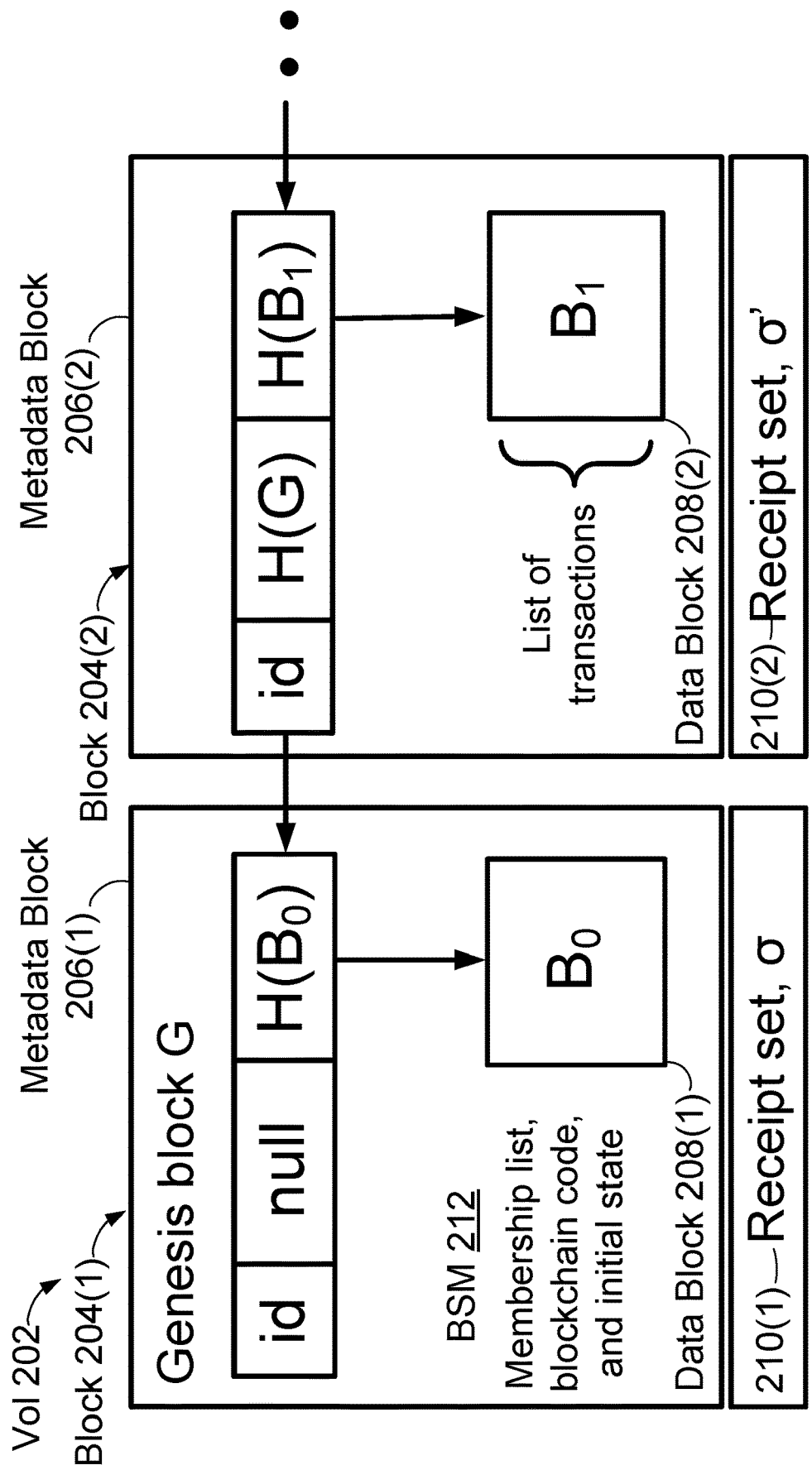
FIGS. 2, 3, and 5 show aspects of volt blockchain system or network examples in accordance with some implementations of the present concepts.

FIG. 2 shows an example blockchain VOL 202. Each volt blockchain network can be associated with an individual VOL. The VOL 202 is an append-only chain of blocks 204 where each block consists of two components: a metadata block 206 and a data block B indicated at 208.

Stated another way, the VOL 202 is an append-only data structure, similar to blockchain in decentralized cryptocurrencies (e.g., each block contains transactions and embeds a cryptographic hash H of its predecessor (e.g., directly preceding block). In volt, a VOL also acts as a mechanism for disseminating a blockchain network's metadata (e.g., the first block in a VOL stores rules that govern the blockchain network it represents). Each entry in a VOL is also accompanied by a set of signatures using the BSP's private key.

Metadata blocks 206 can be a triple: (id, prev, H) where 'id' is the identity of the volt blockchain network represented by the VOL 202, 'prev' is a cryptographic hash of the predecessor block (or null if no predecessor exists (e.g., the genesis block), and 'H' is a cryptographic hash of the corresponding data block 208, which contains a list of transactions.

Some implementations can employ a simple extension where each entry in VOL 202 is accompanied by a set of digital signatures (called receipts or receipt set 210) signed by the private key of the BSP (102, FIG. 1). (This aspect is discussed in more detail below). Also, as in decentralized cryptocurrencies, entries in VOL 202 can be governed by a program, which is called blockchain state machine (BSM) 212. The BSM 212 of the volt blockchain network is stored at the first block (called the genesis block G) in the VOL 202 associated with the network.

From one perspective VOL 202 can be viewed as an append-only data structure, similar to blockchains in decentralized cryptocurrencies (e.g., each block contains transactions and embeds a cryptographic hash H of its predecessor). In volt, the VOL can also act as a mechanism for disseminating a blockchain network's metadata (e.g., the first block in a VOL stores rules that govern the blockchain network it represents). Each entry in a VOL is also accompanied by a set of signatures using the BSP's private key.

The discussion now turns to an example for volt's programming model to express BSMs 212. Volt supports a programming model akin to Ethereum's smart contracts for expressing blockchain state machines 212 (represented here as '$\Psi$'). Where $\Psi c$ consists of ($\Psi c$, $\Psi s$), where $\Psi s$ is the internal state of a BSM and $\Psi c$ is the code that mutates $\Psi s$ by processing a state machine command (i.e., a blockchain transaction). $\Psi c$ is expected to be single threaded and deterministic. It however gets to invoke volt-provided cryptographic libraries (to perform digital signature checks, hashing, etc.) and it gets access to a simple key-value store to persist its internal state.

This discussion collectively describes aspects introduced relative to FIG. 1 with those introduced relative to FIG. 2 to provide details of an example BSP implementation. The BSP (102, FIG. 1) can use VOL (202, FIG. 2) to represent a volt blockchain network (e.g., it records the initial state of the network and all transactions processed by the network on the same VOL). The BSP can expose the following three operations to member nodes: 'Setup', 'Transact', and 'Sync.'

'Setup' takes information for initializing a new volt blockchain network 100 (e.g., blockchain state machine 212, list of member nodes (e.g., membership lists, blockchain code, and/or initial state, among others, illustrated generally at 214). It returns a new genesis block (e.g., metadata block 206(1)) to the calling member node (108, FIG. 1), which contains the setup information as well as the identity for the volt blockchain network just created. The genesis block (e.g., metadata block 206(1)) is signed by the BSP (102, FIG. 1) so that the calling member node can distribute it to other member nodes (108, FIG. 1) and that they can verify the authenticity of the genesis block using the BSP's public key.

'Transact' accepts the identity of an individual volt blockchain network (100, FIG. 1) and a signed transaction, which is a command that mutates the internal state of the volt blockchain network. The BSP (102, FIG. 1) validates the transaction using the blockchain code associated with the volt blockchain network, and appends it to the VOL 202 associated with that volt blockchain network. For higher throughput, the BSP can batch a configurable number of transactions in a single block 204.

'Sync' accepts the identity of the volt blockchain network 100 and returns the VOL 202 associated with the network. For better performance, Sync can accept an additional parameter that enables the member nodes 108 to specify parts of the VOL 202 that they have already downloaded, so that the BSP 102 can simply return subsequent additions to the VOL 202. The above interface is straightforward to implement with a stateful process.

This discussion relates to aspects of the Caesar consensus protocol 106. While the BSP 102 takes care of maintaining a VOL 202, in at least some implementations all honest member nodes 108 must have a consistent view of the VOL i.e., they must all see the same set of blocks 204 in the same order. This special form of agreement can be termed Caesar consensus protocol 106. Unlike traditional consensus, this Caesar consensus protocol involves not only 'n' member nodes, but also the BSP, which is mostly correct and highly resourceful. It is not a general consensus either, but specifically for reaching agreement on an append-only, tamper-resistant ledger. The Caesar consensus protocol 106 leverages the BSP 102 to enable honest members to reach agreement as well as ensure that a "committed" prefix of a VOL 202 is preserved—even if the BSP 102 misbehaves arbitrarily.

Figure 3:
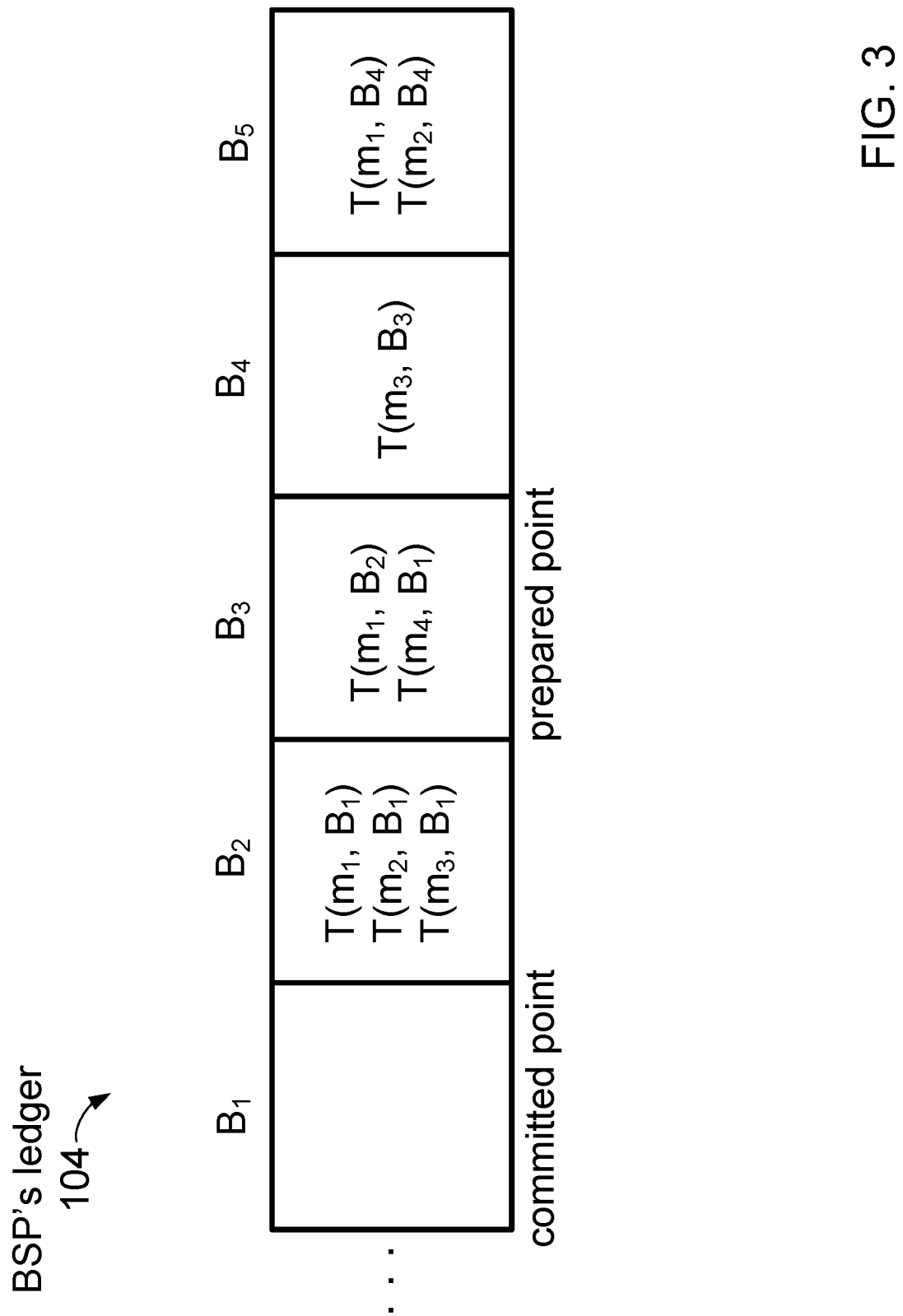

FIG. 3 shows an overview of an example of the BSP's ledger 104. This example uses T(mi, Bj) to denote a heartbeat transaction from a member node mi (designated as 108 in FIG. 1) for block Bj (illustrated as blocks $B_1$-$B_5$ and which are analogous to blocks 204 of FIG. 2). Suppose there are four member nodes and they use BFT with f=1. Observe that 2f+1 members (i.e., m1, m2, m3) have sent heartbeat transactions for block B3 or B4, thus all blocks prior to and including B3 are prepared. To find the committed block with the highest height, members run the same algorithm assuming that the VOL ends at the highest prepared height. This ensures that at least 2f+1 members have witnessed the block at the highest prepared height. Thus, all blocks up to and including B1 are committed.

The description first describes the normal-case Caesar consensus protocol 106, and then shows how to configure the Caesar consensus protocol to handle a wide range of fault models and consistency semantics. In particular, Caesar consensus protocol 106 can be configured so that it can be mapped to a standard Byzantine fault tolerance (BFT) protocol such as PBFT.

A key differentiating aspect of the Caesar consensus protocol 106 is that it leverages the VOL abstraction, where the actual ledger 104 is stored on the BSP (102, FIG. 1) and locally on each member node (108, FIG. 1) (some implementations described below relax this assumption). As a result, the normal case of the Caesar consensus protocol 106 is deceptively simple. It just involves a special heartbeat transaction (m, g, h) σ, where m is the identity of a member node (i.e., its public key), g is the height of the VOL validated by the member node, h is the cryptographic hash of the metadata block at height g, and σ is a digital signature using m. The VOL (202, FIG. 2) at the current height is deemed valid if the VOL is "well-formed." In some implementations there must be a sequence of blocks (204, FIG. 2) where the first one is the genesis block (e.g., 204(1) of FIG. 2) and every subsequent block points cryptographically to the previous one. Further, every transaction included in each block is valid according to the associated blockchain state machine (212, FIG. 2). Also, for each heartbeat transaction (m, g, h) σ included in a block of the VOL, the cryptographic hash h matches the hash of the chain at height g.

Figure 4:
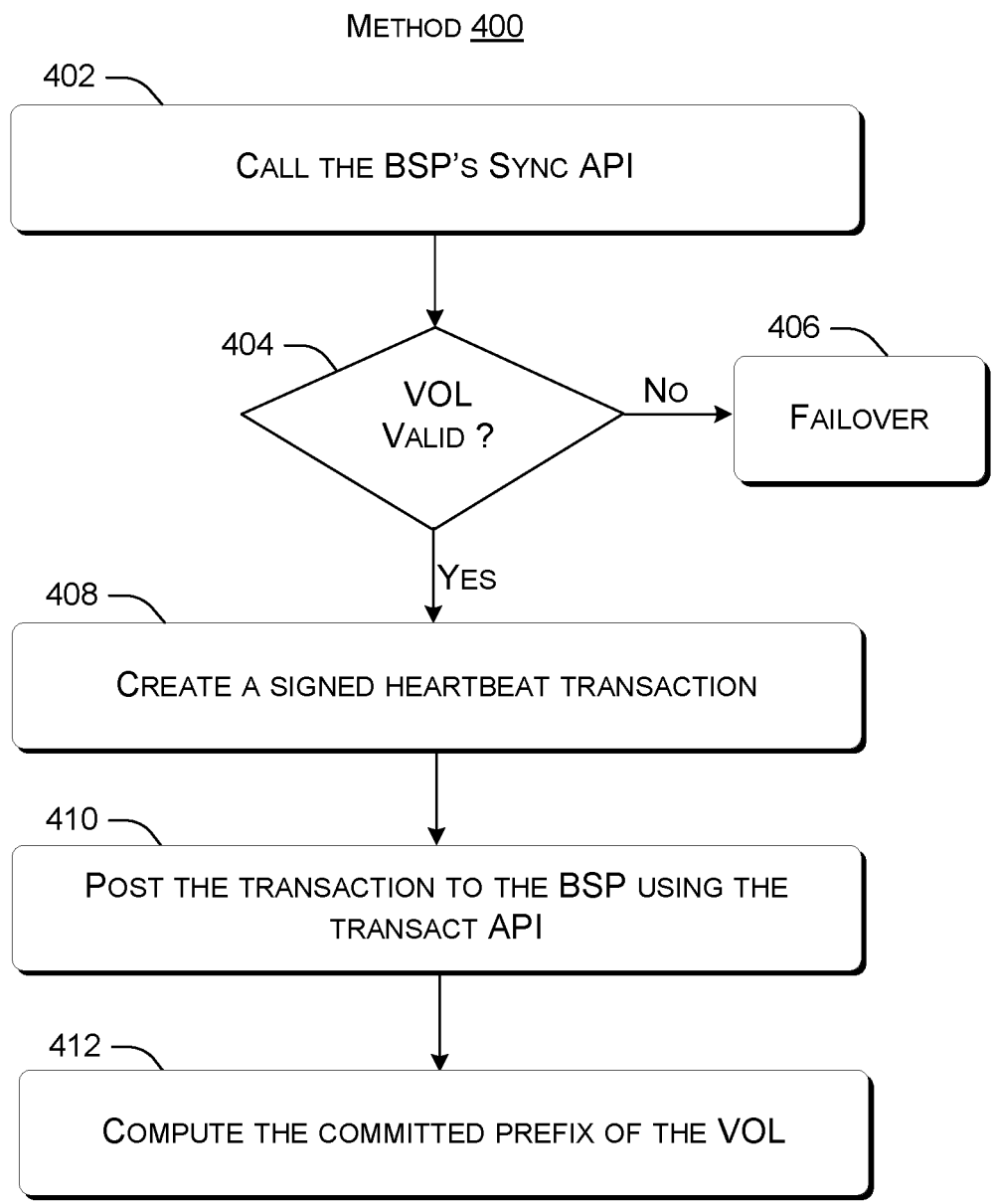
FIGS. 4 and 7-9 show example volt blockchain flowcharts in accordance with some implementations of the present concepts.

As shown in FIG. 4, in some Caesar consensus implementations, member nodes (108, FIG. 1 and represented in this discussion as 'm') (and/or other components) can execute a method 400 of implementing the Caesar consensus protocol. The method can be implemented periodically and/or from time to time. At 402, the method can call the BSP's Sync API to learn the latest addition to the VOL (202, FIG. 2), the current height g, and the cryptographic hash (h) of the metadata block at height g. At 404, the method can check if the VOL remains valid with the latest additions as described earlier. If the VOL is no longer valid, the BSP is considered compromised and result in a failover at 406. If the VOL remains valid, then the method can create a signed heartbeat transaction (m, g, h) σ at 408. At 410, the method can post the transaction to the BSP using the Transact API. At 412, the method can compute the committed prefix of the VOL (i.e., committed height g') by processing heartbeat transactions of other member nodes included in the VOL, according to a policy. This aspect is discussed next.

The Caesar consensus protocol 106 implementation introduced above essentially uses heartbeat transactions as messages typically exchanged in a consensus protocol. Doing so brings several potential benefits. The Caesar consensus protocol leverages the existing Transact API and the VOL, and is therefore straightforward to implement. Potentially more importantly, because all the heartbeat transactions are recorded in the VOL, these implementations can easily instantiate different types of consensus (under different failure assumptions) by defining only the condition under which a prefix of the VOL is considered committed. For example, a member node might trust secure execution environments at other member nodes, so it might be satisfied with a crash-only failure assumption and consider a transaction t committed as soon as it sees heartbeat transactions validating t from a majority of members.

In fact, these policies can be configured on a per-member and/or per-transaction basis based on their respective risk and performance profiles. As an example, for a low-value transaction, a member node might be willing to consider it committed as soon as it gets logged in the VOL (so that it can respond immediately), but it brings a risk: such a transaction can disappear in the (unlikely) event that the BSP is compromised. For a high-value transaction, a member node might instead require that every other member node validate the transaction and then specify that they have done so via a heartbeat transaction, which might increase latency. This additional flexibility is nevertheless practically valuable and even critical in some business applications of blockchains.

It is worth noting that the standard practice (as typically used in permissioned blockchains such as Hyperledger) requires member nodes to run a Byzantine fault tolerance (BFT) protocol on proposed transactions before committing them to a ledger. Such a design cannot accommodate the type of flexibility Caesar consensus protocol offers because the policy is hardwired upfront in the BFT protocol in those approaches. Executing BFT outside of a ledger also adds complexity, which must be trusted.

BFT protocols such as PBFT tolerate up to f Byzantine faults with n=3f+1 replicas. The normal-case protocol involves a primary initiating the protocol with a pre-prepare message, followed by two rounds of multicast, one with prepare messages and another with commit messages, before committing a proposal. A replica must receive messages from at least 2f+1 replicas (including itself) in each round before proceeding. Correctness hinges on the fact that there exists at least one correct replica at the intersection of any two sets of 2f+1 replicas.

As shown in FIG. 4, in some cases Caesar consensus can be configured with n=3f+1 member nodes to tolerate up to f Byzantine faults. The heartbeat transactions can then be mapped on a valid VOL to messages in PBFT, as follows. A block b on the VOL at height g is equivalent to a primary in PBFT multicasting a pre-prepare message for value b in the consensus instance for height g. A heartbeat transaction (m, gm, h) σ with gm≥g serves the purpose of a prepare message from member node m for value b at height g because it implicitly echoes this decision in the VOL.

Let gp be the lowest height at which there exist heartbeat transactions (m, gm, h) σ with gp≥gm≥g from 2f+1 member nodes. At this point, block b at height g is considered prepared. A heartbeat transaction (m, gm, h) σ with gm≥gp serves the purpose of a commit message from member node m for value b at height g because it implicitly echoes a prepare message from 2f+1 member nodes. Let gc be the lowest height at which there exist heartbeat transactions (m, gm, h) σ with gc≥gm≥gp from 2f+1 member nodes m. At this point, block b at height g is considered committed.

For simplicity, the mapping to BFT can be presented from the perspective of a single consensus instance in BFT (e.g., in this mapping, each height on the VOL corresponds to a consensus instance in BFT). However, each heartbeat transaction can actually participate in many consensus instances simultaneously, since each heartbeat transaction validates a linearly-expanding prefix. So, if the VOL has a block prepared (or committed) at height g, then all blocks at height less than g are already prepared (or committed). Therefore, given the current VOL at a certain height, there exists a highest prepared (or committed) height g, at which a block is prepared (or committed) at any height g'≤g. This height is referred to as the current prepared (or committed) point.

The discussion now addresses the role of accountability of the BSP (102, FIG. 1). Recall that the BSP is often instantiated in a cloud, which is resourceful and hardened in terms of reliability, availability, and security. Thus, when the BSP is correct, Caesar consensus protocol executes efficiently.

The BSP (102, FIG. 1) is also accountable, as in the general accountability frameworks. In some cases, this task is simpler due to the structure of a VOL. This can also ensure that faulty member nodes cannot frame the BSP when the BSP is correct. Accountability can be considered in terms of safety, fairness, and liveness.

The BSP (102, FIG. 1) can violate a safety guarantee e.g., by creating a fork in a VOL (202, FIG. 2) by assigning two different blocks to the same height. (It can also create an ill-formed VOL, which is trivial to detect). The existence of any such fork signed by the BSP provides sufficient evidence to blame the BSP because no member nodes (108, FIG. 1) can forge the BSP's signature. Also, observe that member nodes in volt cannot create a fork as long as the BSP is correct.

In addition to safety violations, the BSP (102, FIG. 1) can also violate fairness or liveness e.g., by unfairly dropping or delaying transactions from certain member nodes (108, FIG. 1), or by preventing transactions from being added to the VOL (202, FIG. 2). Doing so could also help evade safety-violation detection by trying to maintain forked views among correct member nodes (108, FIG. 1). For fairness, a member node with trouble getting its transactions accepted by the BSP can broadcast its transactions to all other member nodes who can then piggyback them with their transactions. Thus, unless the BSP drops transactions from all correct member nodes (which turns a fairness violation to a liveness violation), any discrimination against a correct member node will eventually be detected by correct member nodes.

It is hard to detect liveness violations without additional synchrony assumptions. Any member node (108, FIG. 1) experiencing unreasonably long delays for getting its transaction accepted (even after a broadcast) can file a signed complaint with other member nodes. If f+1 members complain, the BSP is malicious, since at least one of those complaints is by a correct member node.

When the BSP (102, FIG. 1) is considered compromised with cryptographically verifiable blames, member nodes (108, FIG. 1) can replace the BSP with a new one. However, in practice, this is a rare event if the BSP is hosted on a reputable cloud provider. To switch to a new BSP, there are several options. The new BSP could be predetermined when the blockchain network is set up, be introduced by a trusted authority when needed, and/or be selected in a consensus protocol run by the member nodes. Note that the committed state of a ledger should be preserved when transferring to a new BSP.

When member nodes (108, FIG. 1) use the above BFT setup, the BFT's view change protocol can be employed. The description below explains how to adapt view changes in this context. First associate a view number with each BSP (102, FIG. 1), which is included in every heartbeat transaction. A new BSP will always have a higher view number than its predecessor, and in Caesar consensus protocol (106, FIG. 1), member nodes stop sending heartbeat transactions in older views (i.e., to an old BSP) after getting a view change message with a higher view number.

During a view change, the new BSP (102, FIG. 1) starts by gathering local state (i.e., a copy of VOL (202, FIG. 2)) from 2f+1 member nodes. Since the previous BSP might have been compromised, VOLs from the member nodes might not be consistent (where consistency is defined below), the new BSP must construct a consistent VOL.

The following definitions can be employed in some implementations. Two VOLs c and c' are consistent if, for 0≤i≤min(gc, gc'), block i on c is the same as block i on c'. Here, gc and gc' are the heights of c and c'.

Constructing a consistent VOL (202, FIG. 2) is now discussed. Let gn be the highest prepared point of valid VOLs from a set C of 2f+1 member nodes (108, FIG. 1). The new BSP (102, FIG. 1) then chooses the VOL up to height gn, which can be shown to be correct. First, the VOL constructed by the BSP is consistent with every valid VOL received because each block up to gn is prepared, and is therefore validated by a set C' of 2f+1 member nodes via heartbeat transactions. Thus, there will not be two conflicting blocks at the same height such that both are prepared because a correct member node in the intersection of C and C' would have validated both. Second, every committed block in the prior network will be included in the VOL constructed by the BSP. This is because, by definition, any committed block b must have been prepared at a set of C" of 2f+1 member nodes. Furthermore, there exists at least one correct member node in the intersection of C and C", so block b must be before gn.

In alternative implementations BSPs (102, FIG. 1) can be modular and outsourced. This section discusses how a cloud provider can architect the BSP so that it is mostly trustworthy. This approach is to decompose the functionality of the BSP into modular, well-defined components/modules, each with narrow responsibilities and interfaces. Such a modular design makes it possible for a cloud provider to harden each component of the BSP separately for performance and security, with different mechanisms. Additionally, this discussion explains how this modular architecture enables the member nodes of a network to outsource storage and computation to the BSP.

Figure 5:
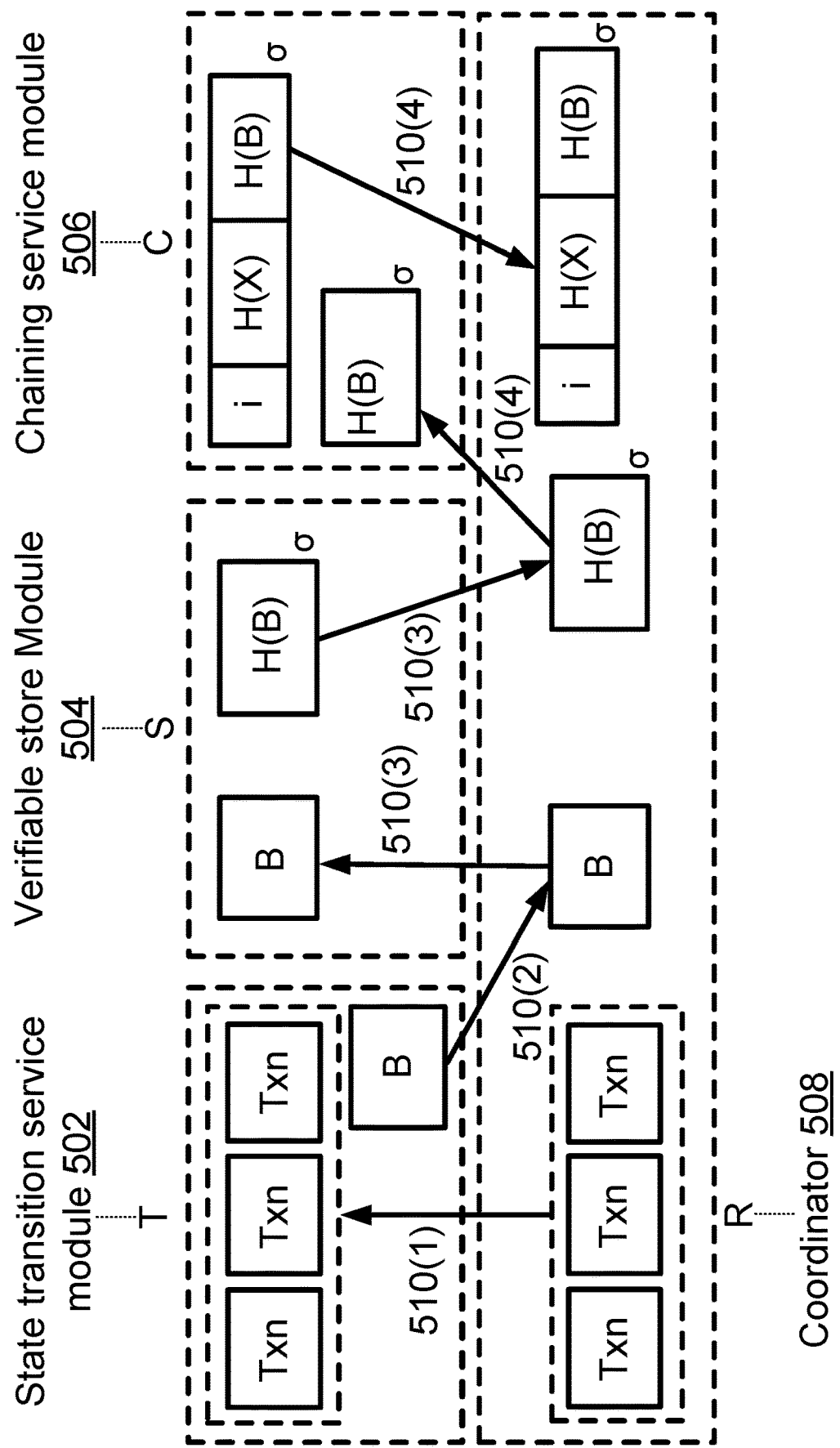

The BSP's functionality includes: storage of blocks, processing transactions using $\Psi c$ to construct new blocks, and chaining them to construct a blockchain. FIG. 5 shows a state transition service module 502 that provides a state transition service "T," a verifiable store module 504 that provides a verifiable storage service "S", a chaining service module 506 that provides a chaining service "C," and a coordinator module 508 that provides a coordinator service "R." From one perspective, modules 502-506 perform individual functions and the coordinator module 508 ties the former modules together.

The discussion now turns to verifiable store module 504. The first component of some BSP implementations is a storage system that relies on a well-known substrate in most untrusted storage systems. This can be a storage system where data items are named by their cryptographic hashes. This enables verifiability i.e., a client of such a system can locally check if it got correct data from the system by comparing the name of the data with the cryptographic hash of the returned data. Verifiable store module 504 stores both data blocks and metadata blocks of a VOL.

Additionally, verifiable store module 504 provides a storage receipt when a member node stores a blob of data in it. The purpose of a storage receipt is to enable verifiable store 504 to convey, such as over an untrusted channel, to entities (that may trust verifiable store 504 for availability and liveness) that the verifiable store is responsible for storing a data item. The verifiable store module 504 owns a key pair of a digital signature scheme, (PKs, SKs), and it exports the following interface.

Deposit(Blob b): stores b in S and returns a tuple (h, σ), where h=H(b) and σ=Signature(SKs, b).

Retrieve(Hash h): returns b such that h=H(b).

The discussion now relates to chaining service "C" provided by chaining service module 506. Chaining service C is responsible for creating new VOLs as well as for maintaining a linear history of blocks of a VOL, stored in S. Perhaps surprisingly, chaining service C only needs to maintain a constant amount of state to accomplish these two tasks, making it easier for a cloud provider to implement chaining service C correctly. The chaining service holds keys of a digital signature scheme (PKc, SKc). The chaining service C exposes the following operations:

Init: assigns an identity for the blockchain network.

Chain: appends a new block stored at S to a previously initialized VOL.

If C does not lose the state map (see pseudocode example below) and SKc, then it maintains the no-fork property: for every metadata block m produced by C, there exists at most one metadata block m' such that predecessor(m')=H(m), where predecessor returns the second field in a metadata block triple. The following lines indicated as 1-21 represent a pseudocode example of the chaining service C.

1 def Init(Hash h, Receipt s):
2 if verifyReceipt(PK_s, h, s)==false:
3 return "Storage receipt check failed"
4 id=random( ) # random 128-bit number
5 if state[id]!=null:
6 return "Internal error; retry"
7
8 state[id]:=(id, h, null, s)
9 return (state[id], signature(SK_c, state[id]))
10
11 def Chain(Guid id, Hash h, Receipt s, Receipt r):
12 if state[id]==null:
13 return "Uninitialized VOL"
14
15 if verifyReceipt(PK_s, state[id], r)==false:
16 return "Storage receipt check failed"
17 if verifyReceipt(PK_s, h, s)==false:
18 return "Storage receipt check failed"
19
20 state[id]=(id, h, H(state[id]), s, r)
21 return (state[id], signature(SK_c, state[id]))

The above pseudocode provides a working example for volt's chaining service (C) internals. In this case, init initializes a new VOL and assigns a random identity, which C remembers in the state map. Chain appends a new block to an already initialized VOL. Note that C relies on S's receipts to ensure that it does not append a block not already stored by S. Of course, if S's signing key is compromised, C can end up appending a block not stored by S.

This discussion addresses state transition service T. The state transition service is responsible for executing blockchain code to processing transactions. The state transition service holds keys of a digital signature scheme (PKt, SKt), and it exposes the following API.

Init(Guid id, Blob b): accepts the identity of a VOL and a blob containing blockchain code and initial state, and setups environment to process transactions.

CreateBlock(Guid id, list<Transaction>l): validates each transaction in l using $\Psi c$ and generates a new block along with a computation receipt signed by SKt. The computation receipt contains a signature on the accepted transactions as well as the hash of the prior list of transactions processed by T.

The discussion now turns to coordinator service "R". The coordinator service implements the BSP's interface. The coordinator service consists of a Web server that receives HTTP requests from member nodes, coordinates various components of the BSP, and responds back to member nodes. The coordinator service is different from the other services in that its correctness does not affect the BSP's correctness. It can only affect liveness.

FIG. 5 depicts life of a transaction in volt. At 510(1) the coordinator service (R) batches transactions and sends them to the state transition service (T). The state transition service (T) responds to the coordinator service R with a block B at 510(2). At 510(3) the coordinator service R stores B on the verifiable store module 504 with receipts (S), which issues a storage receipt. At 510(4) the coordinator service R sends the storage receipt to the chaining service (C).

This section provides rationale for the design of various implementation details. The state transition service module 502's computation receipt constructs a cryptographically chained sequence of transactions grouped into blocks. However, the state transition service module 502 runs code submitted by member nodes (108, FIG. 1), so any exploitable bug in that code can potentially output a computation receipt that creates a fork in a VOL (202, FIG. 2). Of course, Caesar consensus protocol (106, FIG. 1) will detect such safety violations. However, it may be prudent from the perspective of the cloud operator running the BSP to avoid such safety violations. The coordinator module 508 can prevent such violations, but some implementations can employ a less resource intensive solution that can ensure the BSP never creates a fork. These implementations can employ a chaining service. One focus of these implementations can be a relatively minimal component so the BSP can ensure safety with a small trusted computing base (TCB).

Some implementations can outsource the BSP (102, FIG. 1). The BSP can already store a copy of the VOL (202, FIG. 2) and validates transactions. These implementations can allow a member node (108, FIG. 1) to safely outsource most of its computational and storage burden (to participate in a volt blockchain network) to the BSP. The modular design of the BSP makes this outsourcing feasible.

In relation to storage, note that the abstraction of verifiable storage service S lets member nodes (108, FIG. 1) outsource storage without trusting S for safety properties. For example, if they trust the BSP (102, FIG. 1) for durability and availability, they can discard all data blocks (208, FIG. 2) and metadata blocks (206, FIG. 2) in a VOL (202, FIG. 2) they obtained during Caesar consensus—except the latest metadata block—after verifying storage receipts from S. This abstraction also leads to flexible replication policies to reduce reliance on the BSP's S. For example, each member node could be responsible for storing a portion of a VOL: 'ith' block (e.g., a current block) is replicated at member nodes i%k, (i+1)%k, and (i+2)%k, assuming k member nodes with identities from 0 to k−1. More generally, a member node can garbage collect a blob from its local storage when parties they trust for durability and availability send them a storage receipt for that blob. Note that a VOL can be reconstructed as long as there is at least one entity for each VOL entry—even malicious—that is willing to supply the corresponding blob.

In relation to computation involving the modular BSP (102, FIG. 1), state transition service T of FIG. 5 is responsible for executing $\psi c$ to process transactions. T executes blockchain code $\Psi c$ such that member nodes verify that T executed $\Psi$ correctly without reexecuting $\Psi c$. T's computation receipt can include a proof $\pi$ for each block that it is valid according to $\Psi$. Checking $\pi$ is cheap, but the cost of generating $\pi$ remains expensive: many tens of minutes of CPU-time. This approach works for applications that do not wish to make any assumptions about the BSP beyond cryptographic hardness assumptions and can tolerate such expense.

Volt advocates an instantiation of state transition service T based on secure execution environments (i.e., enclaves) in modern processors. This hardware feature provides an efficient VC, albeit under a strong assumption on enclaves. To use such a T, the member nodes (108, FIG. 1) of a volt blockchain network (100, FIG. 1) execute remote attestation with an enclave to confirm that it is running code they approve, and to obtain PKt. Member nodes can then participate in the Caesar consensus protocol (106, FIG. 1) as before, but they now verify computation receipts from an enclave running T to avoid reexecuting W on their side. Finally, when $\Psi$ is outsourced, member nodes might want to access $\Psi$s. There are two options. T can service read requests to $\Psi$s. Alternatively, each VOL entry can report the list of key-value pairs that changed after processing transactions included in the block (204, FIG. 2), so members can fetch those blocks, construct a local cache of key-value pairs they are interested in.

Volt can ensure strong confidentiality properties to member nodes (108, FIG. 1). At a high level, one goal is to ensure that only authorized entities can inspect the state of a volt blockchain network, such as transactions, internal state to process transactions, etc.

Observe that the bulk of the BSP's functions, such as chaining service C and/or verifiable store with receipts S do not need to observe transactions in the clear. Thus, volt uses a semantically secure encryption scheme to encrypt all entries in a VOL (202, FIG. 2), so the sensitive state is not visible to anyone including the BSP (102, FIG. 1). However, the central issues here are who encrypts ledger entries, who manages keys used for encryption, and how to process transactions when they are encrypted.

Since volt's state transition service T already uses secure execution environments for verifiable computation, it can be leveraged for confidentiality. Some implementations can focus on a simpler goal: hiding sensitive state from everyone, including the BSP, except the member nodes (108, FIG. 1) of a volt blockchain network (100, FIG. 1). The state transition service T gets a secret key shared by all member nodes, which it uses to encrypt all data going out of T-blocks to be appended to a VOL (202, FIG. 2). Since the internal state of blockchain code lives inside an enclave-protected memory, it can be automatically encrypted and integrity protected by the secure hardware.

One of the present approaches to confidentiality extends naturally to enforce a general confidentiality policy, with more sophisticated key management schemes. For example, the volt blockchain network (100, FIG. 1) could require that even individual member nodes (108, FIG. 1) cannot access a transaction in the clear, unless they get permission from a quorum of member nodes, or each transaction could have a fine-grained access policy.

A specific implementation of the BSP (102, FIG. 1) can be achieved in C# and the volt library in Python, among other options. In this example implementation, the BSP can be built atop Azure service fabric (or similar competitive cloud service) as it simplifies creating reliable cloud services. Each component of the BSP can be designed as a microservice, so the fabric runtime takes care of isolating these microservices, recovering from failures, and load balancing across a cluster of machines. The microservice that implements verifiable store with receipts (S) can use Azure DocumentDB, for example. Azure DocumentDB is a NoSQL key value store (akin to Amazon DynamoDB) to persist its state reliably. Also, the coordinator microservice exposes the BSP's interface to member nodes (108, FIG. 1) as REST APIs. Benchmark applications and T for Intel SGX can be achieved in C++, among others. A version of Intel SGX can be employed that protects against certain side channel attacks. Finally, this implementation can use SHA-256 for a hash function, and RSA for digital signatures, for instance.

Some of the present designs focus on how to initialize and update a single VOL (202, FIG. 2). An inherent bottleneck is that an application's throughput is limited by the number of entries the BSP can append to a single VOL per second. This problem can be mitigated by employing a partitioning technique. In particular, applications in volt can create multiple VOLs where each VOL is responsible for a shard of the application state. Thus, two transactions that do not mutate the same shard of the application state can be handled in parallel without having to serialize them.

Thus, member nodes (108, FIG. 1) want to achieve a consistent view of multiple VOLs (202, FIG. 2). In these implementations, each heartbeat transaction is now a vector of entries, with an entry for each VOL. But, the rest of the Caesar consensus protocol (106, FIG. 1) can work as before. Also, for simplicity, volt can use a separate VOL to store all the heartbeat transactions of a volt blockchain network (100, FIG. 1).

Some volt implementations can enforce linearizability via Caesar consensus protocol (106, FIG. 1), which in turn can rely on a mechanism similar to heartbeats and beacons. In existing designs, these messages are used to detect forks upon which nodes reconcile histories and to enforce freshness guarantees. However, two clients can have views of the system that are inconsistent with each another at the same time. Whereas, volt's member nodes (108, FIG. 1) declare a transaction as committed only when they are guaranteed to be preserved even with a BSP failover. Thus, any two honest member nodes will always have a consistent view of a VOL (202, FIG. 2) at all times. Other implementations can architect the BSP (102, FIG. 1) for a smaller TCB, which is not covered by previous systems. Existing systems explore small trusted primitives for building trustworthy distributed systems, similar to the present chaining service, but they do not propose end-to-end checks as in Caesar consensus protocol (106, FIG. 1) or verifiable outsourcing.

As mentioned above, BSP (102, FIG. 1) can be implemented in the cloud and/or the BSP can be deployed in a decentralized manner on the infrastructure of member nodes (108, FIG. 1). The BSP is still untrusted (by design), so it reduces the amount of trusted code in a blockchain system compared to systems such as Hyperledger. Additionally, while an instantiation of Caesar consensus protocol (106, FIG. 1) is described that provides guarantees assuming Byzantine members, the present approach generalizes to other failure models (e.g., crashes) and consistency semantics (e.g., eventual consistency). This is possible since volt records all heartbeats in a ledger.

The present concepts lend themselves to an evolving model. Member nodes in volt only rely on BSP's interface, so the BSP can change the underlying implementation anytime, without any approval from member nodes. For each network, volt can assume a static membership list and a blockchain state machine. Volt can allow member nodes to update them and can treat them as additional state agreed-upon in a network. Member nodes can reach consensus on such state updates using a protocol similar to Caesar consensus, without having to significantly change the BSP.

A key concern in blockchain systems is fairness, which requires that malicious entities should not be able to censor transactions of certain users. Permissionless blockchains use incentives and transaction fees to achieve (weak) fairness properties. Since volt advocates using secure enclaves for T, the BSP does not see transactions in plaintext, making it hard for the BSP to discriminate against certain transactions. Note however this is not a panacea. While transaction data and/or some metadata can be hidden (via enclaves or cryptographic methods), the BSP can always filter transactions based on any metadata that can be inferred via collusion with malicious member nodes.

While volt can employ a BSP operated by a cloud provider for performance, it is only one option. Indeed, the BSP's interface exposes a tamper-resistant ledger that can be validated in a decentralized manner (using code submitted by members of a blockchain network). Furthermore, the VOL itself is amenable to porting to a new BSP or any other permissioned blockchain system.

Figure 6A:
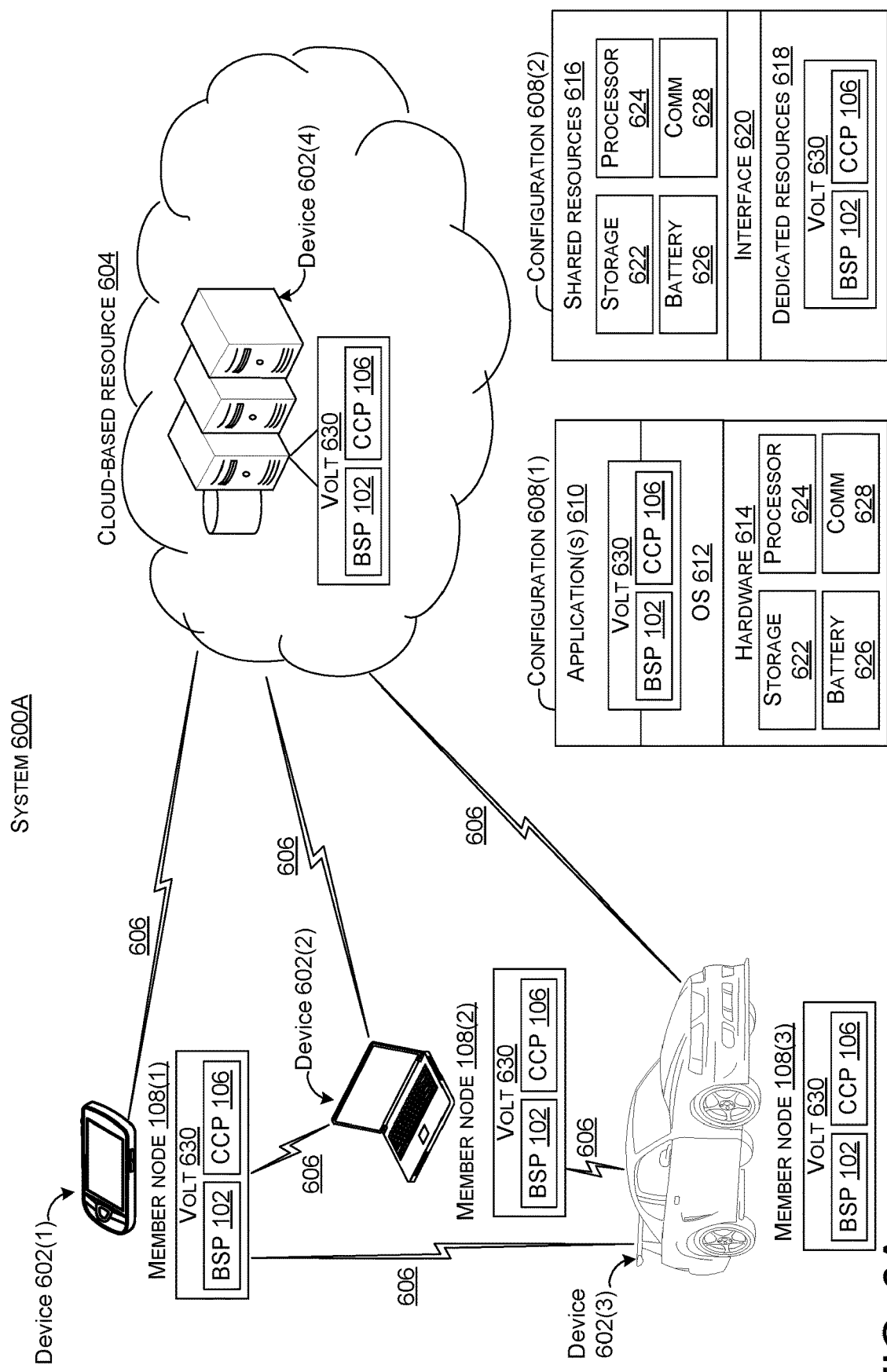
Figure 6B:
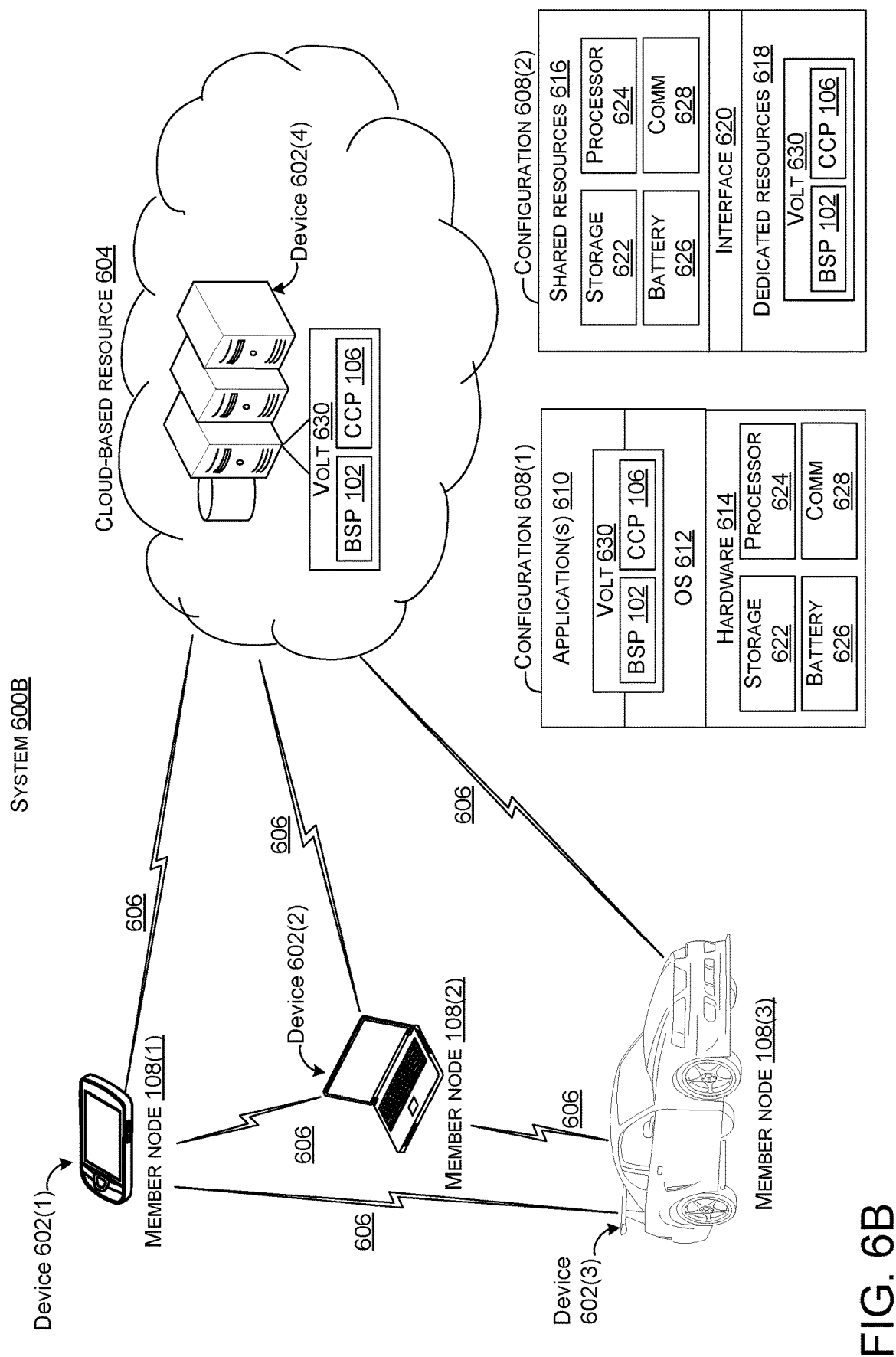
Figure 6C:
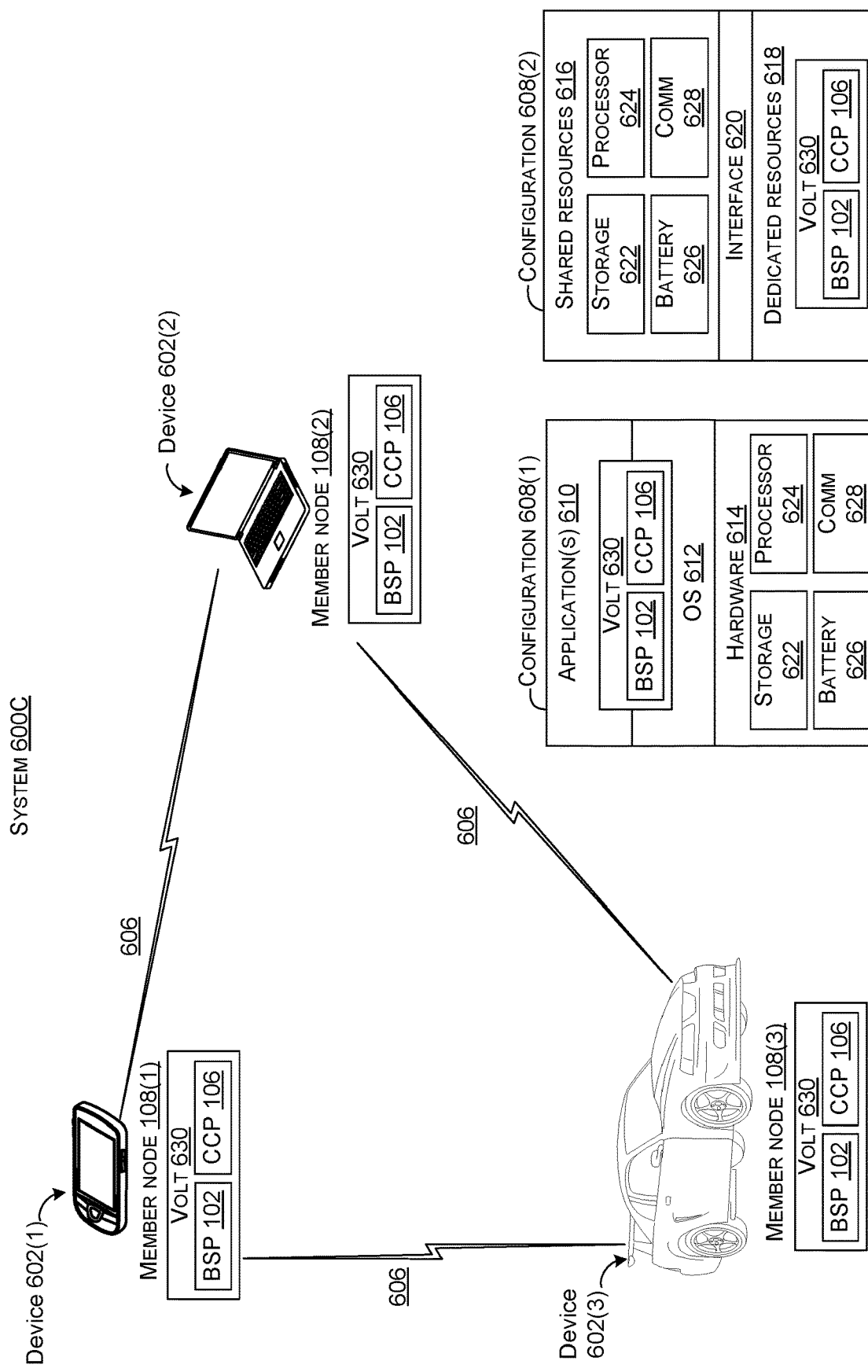

FIGS. 6A-6C show example systems 600A, 600B, and 600C, respectively that can accomplish volt blockchain concepts. For purposes of explanation, systems 600 include devices 602(1), 602(2), 602(3), and 602(4). In this example, device 602(1) is manifest as a smartphone device, example device 602(2) is manifest as a notebook computer, example device 602(3) is manifest as a vehicle, and example device 602(4) is manifest as a server device. For purposes of explanation devices 602(1)-602(3) can function as peers or member nodes 108 and device 602(4) is a cloud-based resource 604. The number and/or positioning of illustrated devices is intended to be representative and non-limiting. Devices 602 can communicate via one or more networks (represented by lightning bolts 606) and/or can access the Internet over the networks. In some cases, parentheticals are utilized after a reference number to distinguish like elements. Use of the reference number without the associated parenthetical is generic to the element.

FIGS. 6A-6C shows two device configurations 608 that can be employed by devices 602. Individual devices 602 can employ either of configurations 608(1) or 608(2), or an alternate configuration. (Due to space constraints on the drawing page, one instance of each configuration is illustrated rather than illustrating the device configurations relative to each device 602). Briefly, device configuration 608(1) represents an operating system (OS) centric configuration. Configuration 608(2) represents a system on a chip (SOC) configuration. Configuration 608(1) is organized into one or more applications 610, operating system 612, and hardware 614. Configuration 608(2) is organized into shared resources 616, dedicated resources 618, and an interface 620 there between.

In either configuration 608, the device can include storage/memory 622, a processor 624, a battery (or other power source) 626, a communication component 628, and/or a volt component 630. The volt component 630 can include a BSP or BSP component 102 and/or a Caesar consensus protocol or (component) 106. The BSP 102 can include a verifiable store module, a chaining service module, and/or a state transition service module (each of which is discussed and designated relative to FIG. 5). In some configurations, each of devices 602 can have an instance of the volt component 630. However, the functionalities that can be performed by individual volt components may be the same or they may be different from one another. For instance, in some cases, such as system 600A of FIG. 6A, each device's volt component 630 can be robust and provide all functionality described above and below (e.g., a device-centric implementation). In other cases, some devices can employ a less robust instance of the volt component that relies on some functionality to be performed remotely (e.g., an app-centric implementation that relies on remote (e.g., cloud) processing). FIG. 6B shows a cloud-centric system 600B. In contrast, system 600C of FIG. 6C is a member-node-centric implementation that does not rely on cloud-based resources.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and/or non-volatile storage media, such as hard drives, optical discs, and flash memory, among others.

As mentioned above, configuration 608(2) can be thought of as a system on a chip (SOC) type design. In such a case, functionality provided by the device can be integrated on a single SOC or multiple coupled SOCs. One or more processors 624 can be configured to coordinate with shared resources 616, such as memory/storage 622, etc., and/or one or more dedicated resources 618, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Examples of devices 602 can include traditional computing devices, such as personal computers, desktop computers, servers, notebook computers, cell phones, smart phones, personal digital assistants, pad type computers, mobile computers, cameras, appliances, smart devices, IoT devices, vehicles, etc. and/or any of a myriad of ever-evolving or yet to be developed types of computing devices.

Figure 7:
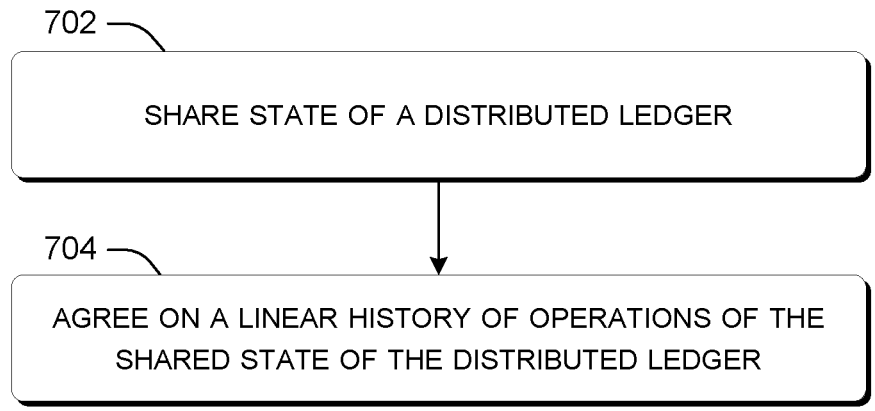

FIG. 7 illustrates a flowchart of a technique or method 700 relating to blockchain techniques.

At block 702, the method can share state of a distributed ledger.

At block 704, the method can agree on a linear history of operations of the shared state of the distributed ledger.

Figure 8:
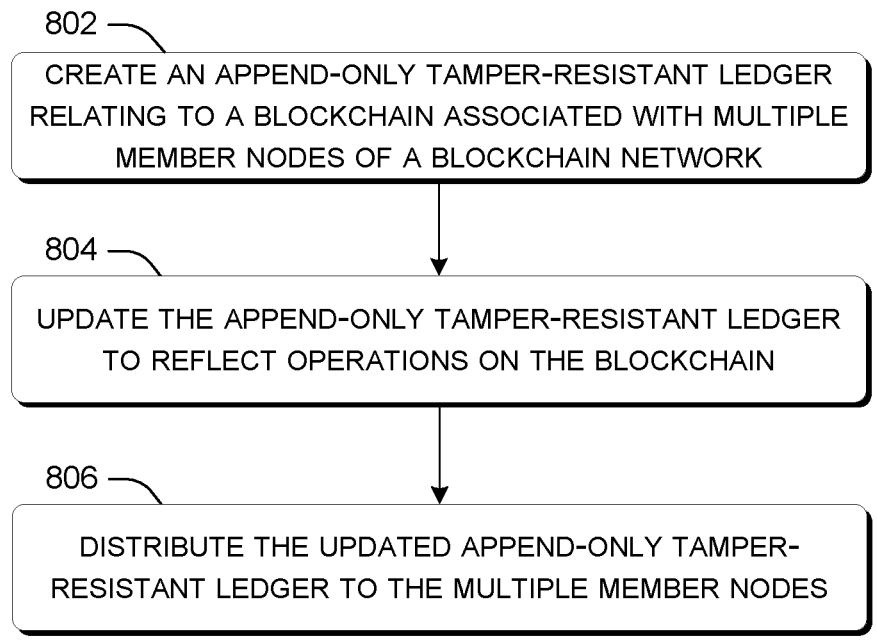

FIG. 8 illustrates another flowchart of a technique or method 800 relating to blockchain techniques.

At block 802, the method can create an append-only tamper-resistant ledger relating to a blockchain associated with multiple member nodes of a blockchain network.

At block 804, the method can update the append-only tamper-resistant ledger to reflect operations on the blockchain.

At block 806, the method can distribute the updated append-only tamper-resistant ledger to the multiple member nodes.

Figure 9:
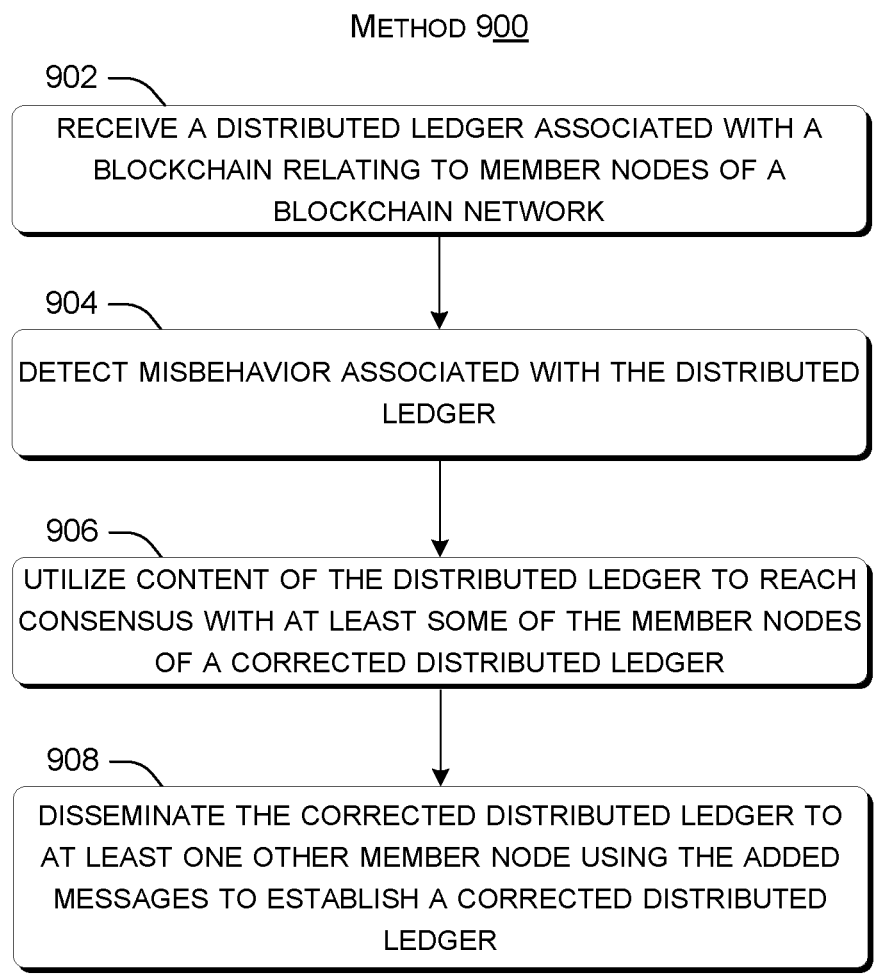

FIG. 9 illustrates another flowchart of a technique or method 900 relating to blockchain techniques.

At block 902, the method can receive a distributed ledger associated with a blockchain relating to member nodes of a blockchain network.

At block 904, the method can detect misbehavior associated with the distributed ledger.

At block 906, the method can utilize content of the distributed ledger to reach consensus with at least some of the member nodes of a corrected distributed ledger.

At block 908, the method can disseminate the corrected distributed ledger to at least one other member node using the added messages to establish a corrected distributed ledger.

The described methods can be performed by the systems and/or elements described above and/or below, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Various examples are described above. Additional examples are described below. One example includes at least one computer-readable storage medium having instructions stored thereon that, when executed by a computing device, cause the computing device to perform acts, comprising receiving an append-only tamper-resistant ledger relating to a blockchain associated with a blockchain network that includes multiple member nodes. The acts performed can also comprise updating the append-only tamper-resistant ledger to reflect operations on the blockchain and distributing the updated append-only tamper-resistant ledger to the multiple member nodes associated with the blockchain network.

Another example can include any of the above and/or below examples where the receiving comprises receiving the append-only tamper-resistant ledger from an individual member node.

Another example can include any of the above and/or below examples where the receiving comprises receiving the append-only tamper-resistant ledger from a blockchain service provider that generated the append-only tamper-resistant ledger.

Another example can include any of the above and/or below examples where the updating comprises appending the append-only tamper-resistant ledger to reflect setup information for the blockchain, transaction information for the blockchain, and synchronization information that specifies parts of the blockchain that have already been downloaded.

Another example can include any of the above and/or below examples where the updating comprises appending changes to the append-only tamper-resistant ledger.

Another example can include any of the above and/or below examples where distributing comprises distributing directly to the member nodes or via a blockchain service provider.

Another example can include a system comprising a processor and a blockchain service provider component executed by the processor and configured to create an append-only tamper-resistant ledger relating to a blockchain associated with multiple member nodes of a blockchain network, update the append-only tamper-resistant ledger to reflect operations on the blockchain and distribute the updated append-only tamper-resistant ledger to the multiple member nodes.

Another example can include any of the above and/or below examples where the system comprises cloud-based resources, or comprises cloud-based resources and the multiple nodes, or comprises the multiple nodes.

Another example can include any of the above and/or below examples where the blockchain comprises a verifiable outsourced ledger.

Another example can include any of the above and/or below examples where the verifiable outsourced ledger comprises a set of blocks.

Another example can include any of the above and/or below examples where each block of the set of blocks contains transactions and embeds a cryptographic hash of a directly preceding block of the set of blocks.

Another example can include any of the above and/or below examples where the verifiable outsourced ledger comprises metadata blocks and datablocks.

Another example can include any of the above and/or below examples where the first of the metadata blocks stores rules that govern the blockchain network.

Another example can include any of the above and/or below examples where each entry reflecting an individual operation is accompanied by a set of signatures encrypted with a private key of the blockchain service provider.

Another example can include any of the above and/or below examples where the verifiable outsourced ledger comprises an append-only datastructure.

Another example can include any of the above and/or below examples where the blockchain comprises blocks that store metadata that includes rules governing the blockchain network.

Another example can include any of the above and/or below examples where the rules are governed by a blockchain state machine.

Another example can include a system comprising a storage storing computer-executable instructions for receiving a distributed ledger associated with a blockchain relating to member nodes of a blockchain network, detecting misbehavior associated with the distributed ledger, utilizing content of the distributed ledger to reach consensus with at least some of the member nodes of a corrected distributed ledger, and disseminating the corrected distributed ledger to at least one other member node using the added messages to establish a corrected distributed ledger. The system can also include a processing device that executes the computer-executable instructions.

Another example can include any of the above and/or below examples where the receiving comprises receiving the distributed ledger provided by a blockchain service provider.

Another example can include any of the above and/or below examples where the detecting comprises detecting misbehavior of the blockchain service provider.

Another example can include any of the above and/or below examples where the utilizing content comprises utilizing prefixes in the distributed ledger to reach the consensus with the at least some of the member nodes.

Another example can include any of the above and/or below examples where the consensus relates to agreement about a set of blocks comprising the blockchain.

Another example can include any of the above and/or below examples where the consensus is based upon a transaction of the distributed ledger that conveys an identity of an individual member node, a validated height of the blockchain, a crypto graphic hash of an individual block at the validated height, and a digital signature of the individual member node.

Another example can include any of the above and/or below examples where the system is implemented on a user device, or on cloud-based resources.

Another example can include any of the above and/or below examples where the system is implemented on as a Caesar consensus protocol.

This description relates to the problem of designing a permissioned blockchain for enterprise applications, among other aspects. Fundamental deployment conflicts in existing resource efficient permissioned blockchains are resolved by leveraging the properties of a tamper-resistant ledger. The result is a permissioned blockchain system that includes the benefits of decentralization, while leveraging untrusted infrastructure such as the cloud, which can offer inexpensive resources.

Although the subject matter relating to blockchains has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one computer-readable storage medium having instructions stored thereon that, when executed by a computing device, cause the computing device to implement a blockchain service provider configured to:
   obtain, by the blockchain service provider, an append-only tamper-resistant ledger associated with a blockchain network that includes multiple member nodes other than the blockchain service provider, the append-only tamper-resistant ledger including at least one block having a metadata block and a datablock, the metadata block including a cryptographic hash corresponding to the datablock, and the datablock containing a list of transactions;
   by the blockchain service provider, update the append-only tamper-resistant ledger to reflect further transactions received from the multiple member nodes other than the blockchain service provider;
   distribute the updated append-only tamper-resistant ledger from the blockchain service provider to the multiple member nodes associated with the blockchain network;
   after updating the append-only tamper-resistant ledger to reflect the further transactions, receive, at the blockchain service provider, a validation message indicating that the updated append-only tamper-resistant ledger, including the further transactions, remains valid based at least on a consensus protocol conducted by the multiple member nodes other than the blockchain service provider; and
   further update the append-only tamper resistant ledger to reflect the received validation message.

2. The computer-readable storage medium of claim 1, wherein the blockchain service provider is configured to:
   obtain the append-only tamper-resistant ledger by receiving the append-only tamper-resistant ledger from an individual member node.

3. The computer-readable storage medium of claim 1, wherein the blockchain service provider is configured to:
   obtain the append-only tamper-resistant ledger by generating the append-only tamper-resistant ledger.

4. The computer-readable storage medium of claim 1, wherein the blockchain service provider is configured to:
   update the append-only tamper-resistant ledger to reflect setup information for the append-only tamper-resistant ledger, transaction information for the append-only tamper-resistant ledger, and synchronization information that specifies parts of the append-only tamper-resistant ledger that have already been downloaded.

5. The computer-readable storage medium of claim 1, wherein the blockchain service provider is configured to:
   after receiving the validation message, send the further updated append-only tamper-resistant ledger reflecting the validation message to at least two of the multiple member nodes.

6. The computer-readable storage medium of claim 5, wherein the validation message is received from another member node.

7. A system, comprising:
a processing device; and,
a blockchain service provider component executed by the processing device and configured to:
create or obtain an append-only tamper-resistant ledger associated with multiple member nodes of a blockchain network other than the blockchain service provider component, the append-only tamper-resistant ledger including at least one block having a metadata block and a datablock, the metadata block including a cryptographic hash corresponding to the datablock, and the datablock containing a list of transactions;
update the append-only tamper-resistant ledger to reflect further transactions received from individual member nodes other than the blockchain service provider component;
distribute the updated append-only tamper-resistant ledger to the individual member nodes;
after updating the append-only tamper-resistant ledger to reflect the further transactions, receive a validation message indicating that the append-only tamper-resistant ledger remains valid, the validation message reflecting a result of a consensus protocol conducted by the multiple member nodes other than the blockchain service provider component; and
further update the append-only tamper-resistant ledger to reflect the received validation message.

8. The system of claim 7, comprising cloud-based resources separate from the multiple member nodes.

9. The system of claim 7, wherein the validation message comprises a heartbeat transaction.

10. The system of claim 9, wherein the append-only tamper-resistant ledger comprises a set of blocks.

11. The system of claim 10, where each block of the set of blocks contains transactions and embeds a corresponding cryptographic hash of a directly preceding block of the set of blocks.

12. The system of claim 9, wherein the append-only tamper-resistant ledger comprises a plurality of metadata blocks and datablocks.

13. The system of claim 12, wherein a first of the metadata blocks stores rules that govern the blockchain network.

14. The system of claim 12, wherein each entry is accompanied by a set of signatures encrypted with a private key of the blockchain service provider component.

15. The system of claim 9, wherein the blockchain service provider component is further configured to:
distribute the further updated append-only tamper-resistant ledger reflecting the validation message to at least two of the individual member nodes.

16. The system of claim 7, wherein the append-only tamper-resistant ledger comprises blocks that store metadata that includes rules governing the blockchain network.

17. The system of claim 16, wherein the rules are governed by a blockchain state machine.

18. A method, comprising:
by a blockchain service provider:
creating an append-only tamper-resistant ledger associated with multiple member nodes of a blockchain network other than the blockchain service provider, the append-only tamper-resistant ledger including at least one block having a metadata block and a datablock, the metadata block including a cryptographic hash corresponding to the datablock, and the datablock containing a list of transactions;
updating the append-only tamper-resistant ledger to reflect further transactions received from individual member nodes other than the blockchain service provider;
distributing the updated append-only tamper-resistant ledger to the individual member nodes;
after updating the append-only tamper-resistant ledger to reflect the further transactions, receiving a validation message indicating that the append-only tamper-resistant ledger remains valid, the validation message reflecting a result of a consensus protocol conducted by the multiple member nodes other than the blockchain service provider; and
further updating the append-only tamper-resistant ledger to reflect the received validation message.

19. The method of claim 18, further comprising:
receiving a request for a sync operation from a particular member node; and
returning at least a portion of the append-only tamper-resistant ledger responsive to the request for the sync operation.

20. The method of claim 19, wherein the request indicates that the particular member node has already downloaded a particular part of the append-only tamper-resistant ledger, and the at least the portion that is returned comprises subsequent additions to the append-only tamper-resistant ledger.

* * * * *